UNITED STATES PATENT OFFICE.

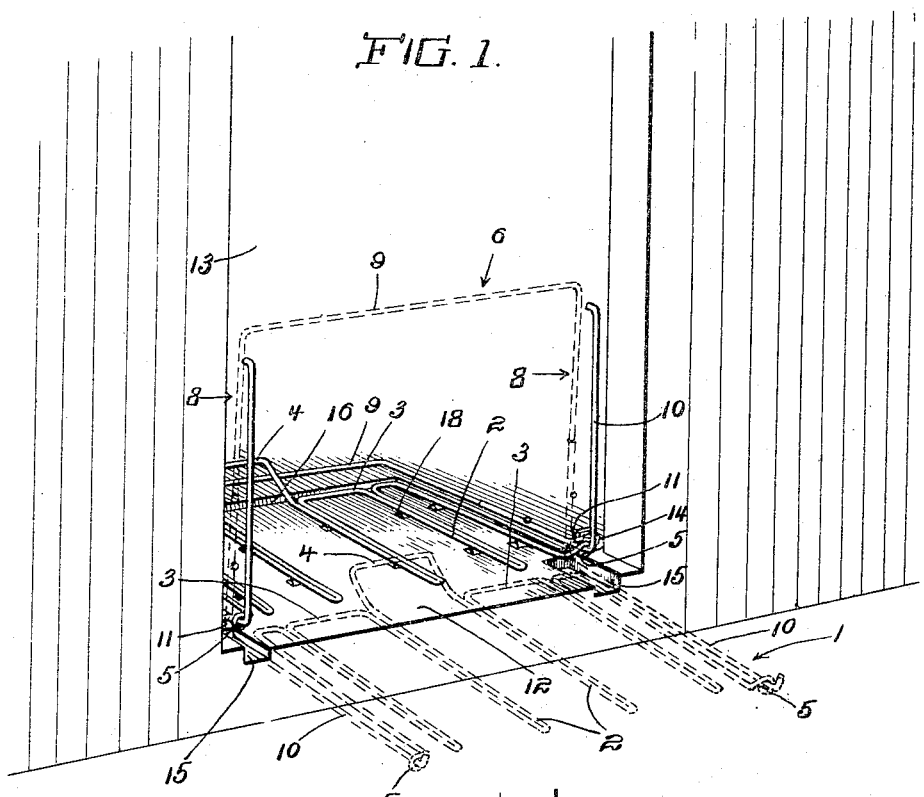
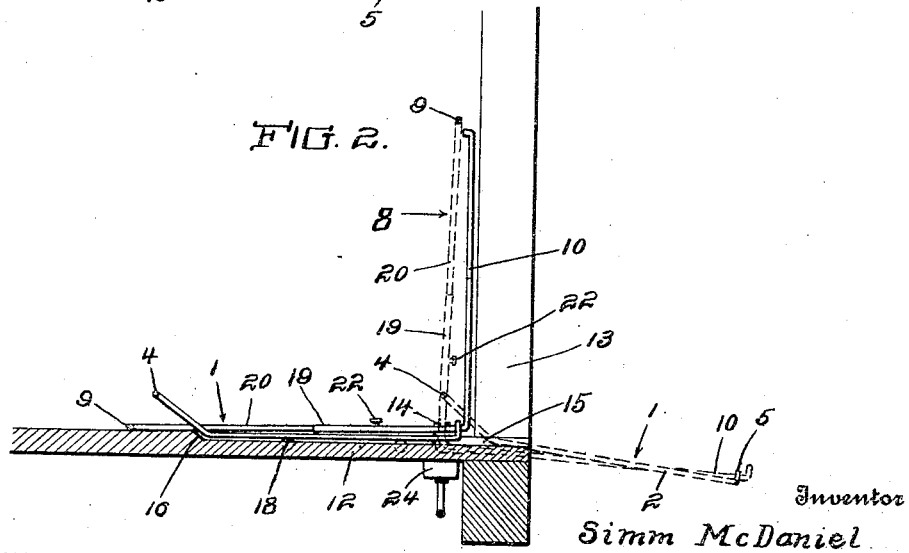

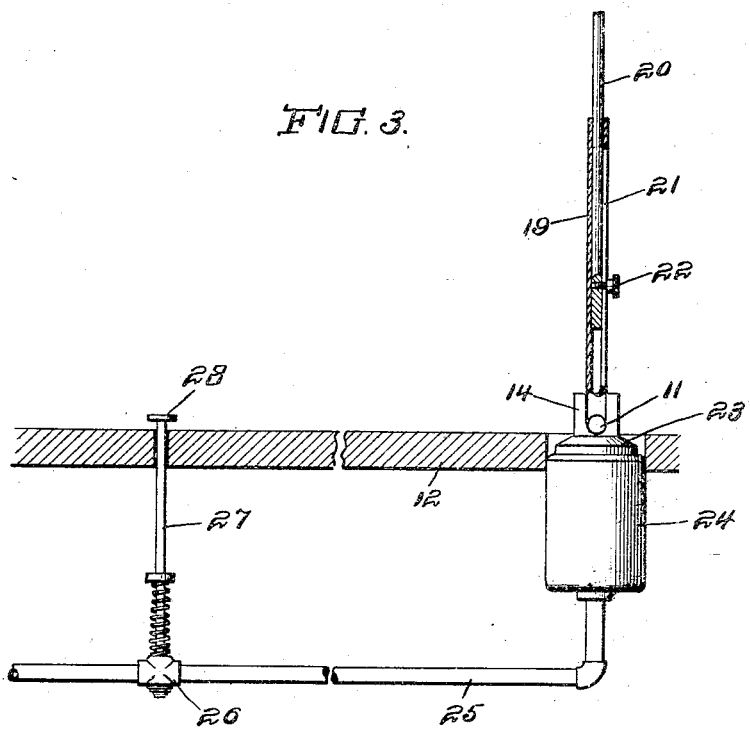
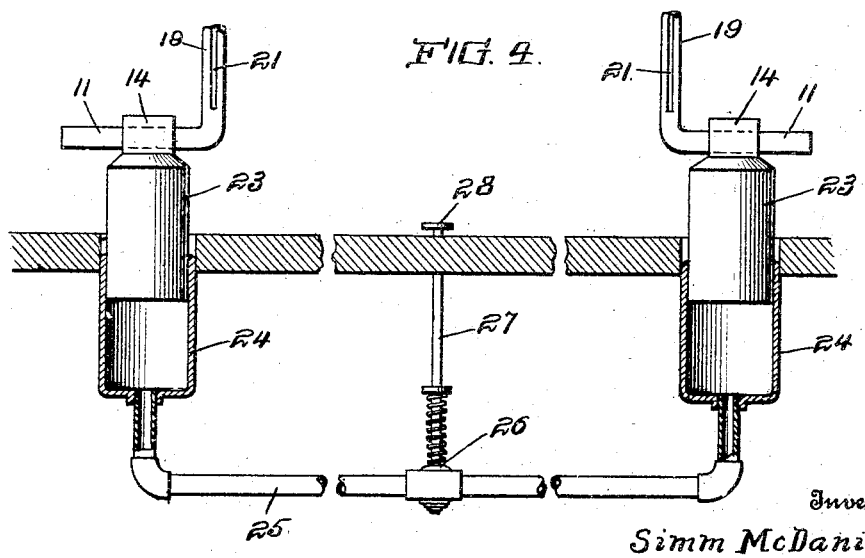

SIMM McDANIEL, OF PAYETTE, IDAHO.

TRUCK LOADER AND UNLOADER.

1,246,765.   Specification of Letters Patent.   Patented Nov. 13, 1917.

Application filed December 15, 1915. Serial No. 66,982.

*To all whom it may concern:*

Be it known that I, SIMM McDANIEL, a citizen of the United States, residing at Payette, in the county of Canyon and State of Idaho, have invented new and useful Improvements in Truck Loaders and Unloaders, of which the following is a specification.

This invention is an improved truck loader and unloader for use especially in the baggage car of a passenger train for transferring trunks and the like from the car to a truck or from the truck to the car, the object of the invention being to provide an improved device of this character which is extremely cheap and simple, and the use of which greatly facilitates the loading and unloading of baggage and other commodities.

The invention consists in the construction, combination and arrangement of devices hereinafter described and claimed.

In the accompanying drawings:—

Figure 1 is a perspective view of a truck loader and unloader constructed in accordance with my invention and showing the same arranged opposite the doorway of a baggage car and in one position in full lines and in another position in dotted lines.

Fig. 2 is a sectional view of the same.

Fig. 3 is a detail sectional view.

Fig. 4 is a detail sectional view of the compressed air actuated means for raising and lowering the loader and unloader.

In the embodiment of my invention I provide a carrier 1 which is here shown as formed from a single bar or rod of metal bent to form a series of arms 2 which are spaced apart and the spaces between which are open at their outer ends, said arms being connected together at their inner ends as at 3 and the connection 4 between the inner ends of the centrally arranged arms constituting a handle. The outer arms of the carrier at their front ends, are provided with guiding and pivoting eyes 5.

In connection with the carrier I provide a tilting and guiding element 6 which comprises a pair of arms 8, a lever bar 9 connecting the inner ends of said arms, guiding arms 10 arranged at right angles to the arms 8 and a pair of outwardly extending pivoting spindles 11 which are arranged near the angles between the arms 8—10. The guiding arms 10 pass through the eyes 5 of the carrier so that the carrier is slidably and also pivotally connected to the tilting and guiding element 6. The device is installed on the floor 12 of a baggage car in the doorway 13, the pivoting spindles 11 being mounted in bearings 14 on the car floor at the sides of the doorway. The floor is also provided with grooves 15 to receive the arms of the carrier and with a rabbet 16 in its upper side in which the carrier is arranged when drawn into the car as shown in full lines in Fig. 1 so that the carrier is flush or substantially so with the surface of the floor and forms no appreciable obstructions thereon.

The operation of my truck loader and unloader is as follows. The same is in normal position, when the carrier is on the floor of the car and the tilting and guiding element 6 is arranged with its lever bar 9 also on the car floor and its arms 10 in vertical position as shown in full lines in Figs. 1 and 2. To deliver trunks or the like from the car onto a truck along side the car, assuming that the car door is open, the load is first placed on the carrier 1. The operator then grasps the lever bar 9 with one hand and raises the same, thus turning the tilting and guiding element 6 on its pivots and causing the arms 10 to be projected out through the doorway and beyond the car and arranged in a downwardly and outwardly inclined position as shown in dotted lines in Figs. 1 and 2, the arms 8 of the tilting and guiding element being substantially vertical. Such turning movement of the tilting and guiding element greatly facilitates the starting of the carrier outwardly. The guiding pivoting eyes 5 of the carrier move from the arms 8 to the arms 10 and outwardly past the angle between said arms. The arms 10 form in effect an inclined plane down which the carrier may be readily manually pushed and with but slight exertion on the part of the operator, who grasps the handle 4 with the other hand for this purpose. When the carrier reaches the outer ends of the arms 10, as shown, in dotted lines in said Figs. 1 and 2, it is above the truck and the load may be then readily turned from said carrier onto the truck, as will be understood. To transfer a trunk or the like from a truck into the car, the tilting and guiding element and the carrier are first arranged in the positions shown in dotted lines in Figs. 1 and 2, with the carrier and the arms 10 of the tilting and guiding element above the truck. The trunk or other object is then placed or rolled on the carrier element, and the operator, within the car grasps the handle 9 of the tilting and guiding elements and turns said handle 9 downwardly, thus arranging the arms 8 on the bottom of the car as shown in full lines in Figs. 1 and 2 and raising the arms 10 to vertical position. The initial movement of the tilting and guiding element causes its arms 10 to raise the outer end of the carrier and to tilt the latter inwardly, thus enabling the carrier to be readily drawn manually inwardly into the car by the handle 4, as will be understood, together with the trunk or other object on said carrier.

The truck is preferably also provided in its floor with grooves for the reception of the arms of the carrier.

To facilitate the movement of the carrier the car floor may be provided with suitable anti-friction rollers 18 on which the arms of the carrier operate. To vary the leverage of the tilting and guiding element the arms 8 thereof are made longitudinally extensible and each formed with a pair of telescopically arranged members 19—20, the tubular members 19 having slots 21 and the members 20 having adjusting screws 22 which operate in said slots.

The spindles 11 of the tilting and guiding elements 6 have their bearings 14 at the upper ends of pistons 23 which are vertically movable in compressed air cylinders 24 which are supplied, when desired, with compressed air from the air brake apparatus through pipes 25 and a controlling valve 26. The pipes are arranged under the car bottom. The controlling valve has a vertical operating rod 27 which extends up through the floor of the car and is provided at its upper end with a tread 28 which may be readily stepped on to open the valve and hence admit compressed air to the cylinders 24 and thereby cause the truck loader and unloader to be raised about six inches more or less, with the load perpendicular and may then be lowered onto the truck, the compressed air raising and lowering apparatus greatly facilitating the operation of the truck loader and unloader.

Having thus described my invention, I claim:—

1. A truck loader and unloader of the class described comprising a tilting and guiding element having a lever arranged at an angle thereto, bearings mounted on the floor of a car and on which bearings said tilting and guiding element is pivotally mounted and a carrier supported on the floor and also mounted for longitudinal movement on said tilting and guiding element and for pivotal movement therewith.

2. A truck loader and unloader of the class described comprising a tilting and guiding element having a lever arranged at an angle thereto, bearings mounted on the floor of a car and on which bearings said tilting and guiding element is pivotally mounted and a carrier supported on the floor and also mounted for longitudinal movement on said tilting and guiding element and for pivotal movement therewith, and means to raise and lower said bearings and thereby raise and lower said tilting and guiding element and said carrier.

3. A truck loader and unloader of the class described comprising a tilting and guiding element having a lever arranged at an angle thereto, bearings mounted on the floor of a car and on which bearings said tilting and guiding element is pivotally mounted and a carrier supported on the floor and also mounted for longitudinal movement on said tilting and guiding element and for pivotal movement therewith, and compressed air operated means for raising and lowering said bearings and thereby raising and lowering said tilting and guiding element and said carrier.

4. A truck loader and unloader of the class described comprising a tilting and guiding element mounted on the floor of the car and a carrier mounted for longitudinal and for pivotal movement on said tilting and guiding element, the said carrier having spaced arms and the car floor being provided with grooves or channels to receive said arms.

5. A truck loader and unloader of the class described comprising a tilting and guiding element having a longitudinal extensible lever arranged at an angle thereto, bearings mounted on a floor of a car and on which said tilting and guiding element is mounted for pivotal movement, and a carrier supported on the floor and also mounted for longitudinal movement on said tilting and guiding element and for pivotal movement therewith.

In testimony whereof I affix my signature in presence of two witnesses.

SIMM McDANIEL.

Witnesses:
F. H. LYON,
CARL W. GIESLER.

Copies of this patent may be obtained for five cents each, by addressing the "Commissioner of Patents, Washington, D. C."